US009160042B2

(12) United States Patent
Fujii et al.

(10) Patent No.: US 9,160,042 B2
(45) Date of Patent: Oct. 13, 2015

(54) BATTERY PACK FOR ELECTRIC VEHICLE AND BATTERY PACK MOUNTING STRUCTURE

(71) Applicant: HONDA MOTOR CO., LTD., Tokyo (JP)

(72) Inventors: Ryo Fujii, Wako (JP); Koichi Yamamoto, Wako (JP); Goichi Katayama, Wako (JP); Kosuke Ito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/354,298

(22) PCT Filed: Nov. 9, 2012

(86) PCT No.: PCT/JP2012/079100
§ 371 (c)(1),
(2) Date: Apr. 25, 2014

(87) PCT Pub. No.: WO2013/073465
PCT Pub. Date: May 23, 2013

(65) Prior Publication Data
US 2014/0338998 A1    Nov. 20, 2014

(30) Foreign Application Priority Data

Nov. 14, 2011   (JP) ................................. 2011-248436

(51) Int. Cl.
*B60R 16/04*    (2006.01)
*H01M 10/625*   (2014.01)
(Continued)

(52) U.S. Cl.
CPC ............. *H01M 10/5016* (2013.01); *B60K 1/04* (2013.01); *H01M 10/5063* (2013.01);
(Continued)

(58) Field of Classification Search
CPC ................. B60K 2001/005; B60K 2001/0438; B60K 2001/0433
USPC ........................................................ 180/68.5
See application file for complete search history.

(56) References Cited

U.S. PATENT DOCUMENTS 5,390,754 A * 2/1995 Masuyama et al. .......... 180/68.5
5,392,873 A * 2/1995 Masuyama et al. .......... 180/68.5
(Continued)

FOREIGN PATENT DOCUMENTS

JP    2009-87646 A    4/2009
JP    2012-96716 A    5/2012

OTHER PUBLICATIONS

International Search Report dated Jan. 15, 2013, issued in corresponding application No. PCT/JP2012/079100.

*Primary Examiner* — Jeffrey J Restifo
(74) *Attorney, Agent, or Firm* — Westerman, Hattori, Daniels & Adrian, LLP

(57) ABSTRACT

In a battery pack for an electric vehicle, since a cooling air suction port (48a) is provided in the vicinity of an end part, on the downstream side in a direction of flow of cooling air, of a battery case (24) so as to oppose the direction of flow, cooling air is in full contact with the battery case (24) before flowing into the cooling air suction port (48a), and dust or water contained in cooling air can be made to adhere to the battery case (24) and removed, thus preventing dust or water from entering the interior of the battery case (24). In particular, since the battery case (24) includes a projecting portion (39a) that rises on the upstream side in the direction of flow of the cooling air suction port (48a) and disturbs the flow of cooling air, and an upper end of the projecting portion (39a) is at a position higher than that of the cooling air suction port (48a), it is possible to reliably put cooling air in contact with the projecting portion (39a) of the battery case (24), thus enhancing the effect in removing dust or water.

7 Claims, 8 Drawing Sheets

(51) Int. Cl.
  *B60K 1/04* (2006.01)
  *H01M 10/6561* (2014.01)
  *H01M 10/6566* (2014.01)
  *B60K 1/00* (2006.01)

(52) U.S. Cl.
  CPC ....... *H01M 10/625* (2015.04); *H01M 10/6566* (2015.04); *B60K 2001/005* (2013.01); *B60K 2001/0438* (2013.01); *H01M 2220/20* (2013.01)

(56) References Cited

U.S. PATENT DOCUMENTS

| | | | | |
|---|---|---|---|---|
| 5,490,572 A * | 2/1996 | Tajiri et al. | | 180/65.1 |
| 5,937,664 A * | 8/1999 | Matsuno et al. | | 62/259.2 |
| 6,094,927 A * | 8/2000 | Anazawa et al. | | 62/239 |
| 6,188,574 B1 * | 2/2001 | Anazawa | | 361/695 |
| 7,353,900 B2 * | 4/2008 | Abe et al. | | 180/68.5 |
| 7,654,351 B2 * | 2/2010 | Koike et al. | | 180/68.5 |
| 7,688,582 B2 * | 3/2010 | Fukazu et al. | | 361/690 |
| 7,810,596 B2 * | 10/2010 | Tsuchiya | | 180/68.5 |
| 7,900,727 B2 * | 3/2011 | Shinmura | | 180/68.1 |
| 8,016,063 B2 * | 9/2011 | Tsuchiya | | 180/68.5 |
| 8,430,194 B2 * | 4/2013 | Yamatani | | 180/68.1 |
| 8,440,338 B2 * | 5/2013 | Sato et al. | | 429/71 |
| 8,556,017 B2 * | 10/2013 | Kubota et al. | | 180/68.5 |
| 8,561,743 B2 * | 10/2013 | Iwasa et al. | | 180/68.5 |
| 8,567,543 B2 * | 10/2013 | Kubota et al. | | 180/68.5 |
| 8,662,226 B2 * | 3/2014 | Varns et al. | | 180/68.5 |
| 2005/0011692 A1 * | 1/2005 | Takahashi et al. | | 180/68.5 |
| 2009/0260905 A1 * | 10/2009 | Shinmura | | 180/68.1 |
| 2012/0018238 A1 * | 1/2012 | Mizoguchi et al. | | 180/68.5 |
| 2013/0025953 A1 * | 1/2013 | Saeki | | 180/68.5 |
| 2014/0262573 A1 * | 9/2014 | Ito et al. | | 180/68.5 |
| 2014/0284125 A1 * | 9/2014 | Katayama et al. | | 180/68.5 |
| 2014/0338998 A1 * | 11/2014 | Fujii et al. | | 180/68.5 |
| 2014/0338999 A1 * | 11/2014 | Fujii et al. | | 180/68.5 |
| 2014/0374180 A1 * | 12/2014 | Katayama et al. | | 180/68.5 |

* cited by examiner

BATTERY PACK FOR ELECTRIC VEHICLE AND BATTERY PACK MOUNTING STRUCTURE

TECHNICAL FIELD

The present invention relates to a battery pack for an electric vehicle that includes a battery case that houses a plurality of batteries, a cooling air suction port that sucks cooling air into a cooling passage formed in an interior of the battery case, and a cooling air discharge port that discharges cooling air from the cooling passage, and to a battery pack mounting structure for mounting the battery pack on an electric vehicle.

BACKGROUND ART

An arrangement in which a cooling air inlet provided at the front end of a battery case of an electric automobile is connected to a heat exchange unit of a vehicle-mounted air conditioner via a blower duct, cooling air issuing from the vehicle-mounted air conditioner is supplied from the blower duct to the interior of the battery case so as to cool the battery, and cooling air having an increased temperature is then discharged outside the battery case by means of an exhaust fan is known from Patent Document 1 below.

RELATED ART DOCUMENTS

Patent Documents

Patent Document 1: Japanese Patent Application Laid-open No. 2009-87646

SUMMARY OF THE INVENTION

Problems to be Solved by the Invention

Although cooling air issuing from the vehicle-mounted air conditioner has been rid of dust or water and is clean, when air outside a vehicle compartment is introduced into the interior of the battery case as it is as cooling air, there is a possibility that dust or water will enter the interior of the battery case together with cooling air. In particular, if the battery becomes wet with water entering the interior of the battery case, there is a possibility of a short circuit between the batteries or a ground fault between the battery and a vehicle body occurring, and it is therefore necessary to prevent water from entering the battery case. Here, removing dust or water from the cooling air by the use of a filter could be considered, but if a filter were to be used, not only would the number of components or the cost increase, but there would also be the problem that the pressure loss of cooling air would increase and the flow rate of cooling air supplied to the interior of the battery case would decrease.

The present invention has been accomplished in light of the above-mentioned circumstances, and it is an object thereof to prevent dust or water from being sucked into the interior of a battery case by means of a simple structure.

Means for Solving the Problems

In order to attain the above object, according to a first aspect of the present invention, there is provided a battery pack for an electric vehicle, the battery pack comprising a battery case that houses a plurality of batteries, a cooling air suction port that sucks cooling air into a cooling passage formed in an interior of the battery case, and a cooling air discharge port that discharges cooling air from the cooling passage, wherein the cooling air suction port is provided in the vicinity of an end part on the downstream side, in a direction of flow of cooling air, on an exterior of the battery case so as to oppose the direction of flow, the battery case comprises a projecting portion that rises on the upstream side in the direction of flow of the cooling air suction port so as to disturb the flow of cooling air, and an upper end of the projecting portion is at a position higher than an upper end of the cooling air suction port.

Further, according to a second aspect of the present invention, in addition to the first aspect, the projecting portion is formed so that a height thereof changes in a stepped manner in going from the upstream side in the direction of flow toward the cooling air suction port.

Furthermore, according to a third aspect of the present invention, in addition to the first or second aspect, the projecting portion is formed so as to be hollow, and a heat generating member is housed in an interior thereof.

Moreover, according to a fourth aspect of the present invention, there is provided a battery pack mounting structure according to any one of the first to third aspects, wherein the battery case is mounted beneath a floor panel of the vehicle, and a cooling air introduction passage for introducing cooling air into the cooling air suction port is formed between the floor panel and the battery case.

Further, according to a fifth aspect of the present invention, in addition to the fourth aspect, the floor panel comprises a footrest portion that is for an occupant to place his/her feet on, a vertical wall portion that rises upwardly from the footrest portion, and a seat support portion that extends rearwardly from the vertical wall portion and supports a rear seat, and the cooling air introduction passage is formed into a cranked shape between the projecting portion and the footrest portion, vertical wall portion and seat support portion.

Furthermore, according to a sixth aspect of the present invention, in addition to the fourth or fifth aspect, an irregularly shaped portion is formed on the floor panel opposing the projecting portion.

A junction board 28 of an embodiment corresponds to the heat generating member of the present invention, and a battery module 42 of the embodiment corresponds to the battery or the heat generating member of the present invention.

Effects of the Invention

In accordance with the first aspect of the present invention, cooling air flowing outside the battery case housing the plurality of batteries flows into the cooling passage formed in the interior of the battery case via the cooling air suction port so as to cool the batteries and is then discharged outside the battery case via the cooling air discharge port. Since the cooling air suction port is provided in the vicinity of an end part, on the downstream side in the direction of flow of cooling air, of the battery case so as to oppose the direction of flow, cooling air is in full contact with the battery case before flowing into the cooling air suction port, and dust or water contained in cooling air can be made to adhere to the battery case and removed, thus preventing dust or water from entering the interior of the battery case. In particular, since the battery case includes the projecting portion that rises on the upstream side in the direction of flow of the cooling air suction port and disturbs the flow of cooling air, and the upper end of the projecting portion is at a position higher than that of the cooling air suction port, it is possible to reliably put cooling air in contact with the projecting portion of the battery case, thus enhancing the effect in removing dust or water.

Furthermore, in accordance with the second aspect of the present invention, since the projecting portion of the battery case is formed so that its height changes in a stepped manner from the upstream side in the direction of flow of cooling air toward the cooling air suction port, it is possible to remove dirt or water contained in cooling air more effectively by increasing the surface area of the projecting portion that is in contact with cooling air by means of the stepped portion.

Moreover, in accordance with the third aspect of the present invention, since the projecting portion of the battery case is formed as a hollow, and the heat generating member is housed in the interior thereof, it is possible to quickly evaporate water removed from cooling air and adhering to the projecting portion by means of heat from the heat generating member, thus more reliably preventing the battery from becoming wet with water.

Furthermore, in accordance with the fourth aspect of the present invention, since the battery case is mounted beneath the vehicle floor panel, and the cooling air introduction passage for introducing cooling air into the cooling air suction port is formed between the floor panel and the battery case, cooling air comes into contact with both the floor panel and the battery case until reaching the cooling air suction port, thereby removing more effectively dirt or water contained in the cooling air.

Moreover, in accordance with the fifth aspect of the present invention, since the floor panel includes the footrest portion for an occupant to place his/her feet on, the vertical wall portion rising upwardly from the footrest portion, and the seat support portion extending rearwardly from the vertical wall portion and supporting the rear seat, the crank-shaped cooling air introduction passage is formed between the floor panel and the battery case, thereby removing more effectively dirt or water from cooling air flowing therethrough.

Furthermore, in accordance with the sixth aspect of the present invention, since the irregularly shaped portion is formed on the floor panel opposing the projecting portion of the battery case, it is possible to remove dirt or water more effectively by putting cooling air flowing through the cooling air introduction passage into contact with the irregularly shaped portion of the floor panel.

EXPLANATION OF REFERENCE NUMERALS AND SYMBOLS

Figure 1:
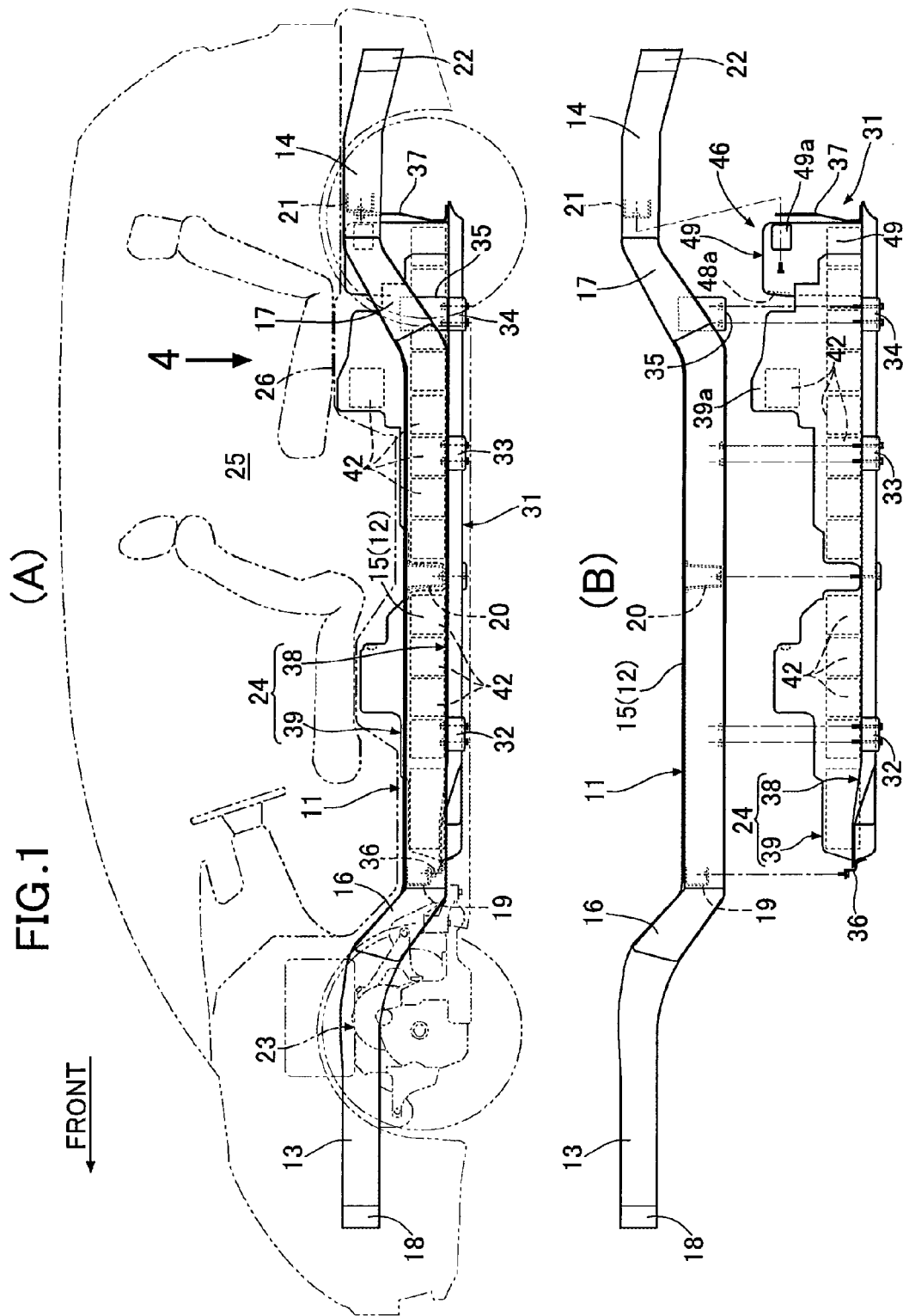
FIG. 1 is a side view of an electric automobile. (first embodiment)

24 Battery case
26 Floor panel
26a Footrest portion
26b Vertical wall portion
26c Seat support portion
26d Irregularly shaped portion
28 Junction board (heat generating member)
29 Rear seat
30 Cooling air introduction passage
31 Battery pack
39a Projecting portion
42 Battery module (battery, heat generating member)
48a Cooling air suction port
49a Cooling air discharge port

MODES FOR CARRYING OUT THE INVENTION

A mode for carrying out the present invention is explained below by reference to FIG. 1 to FIG. 8.

First Embodiment

Figure 2:
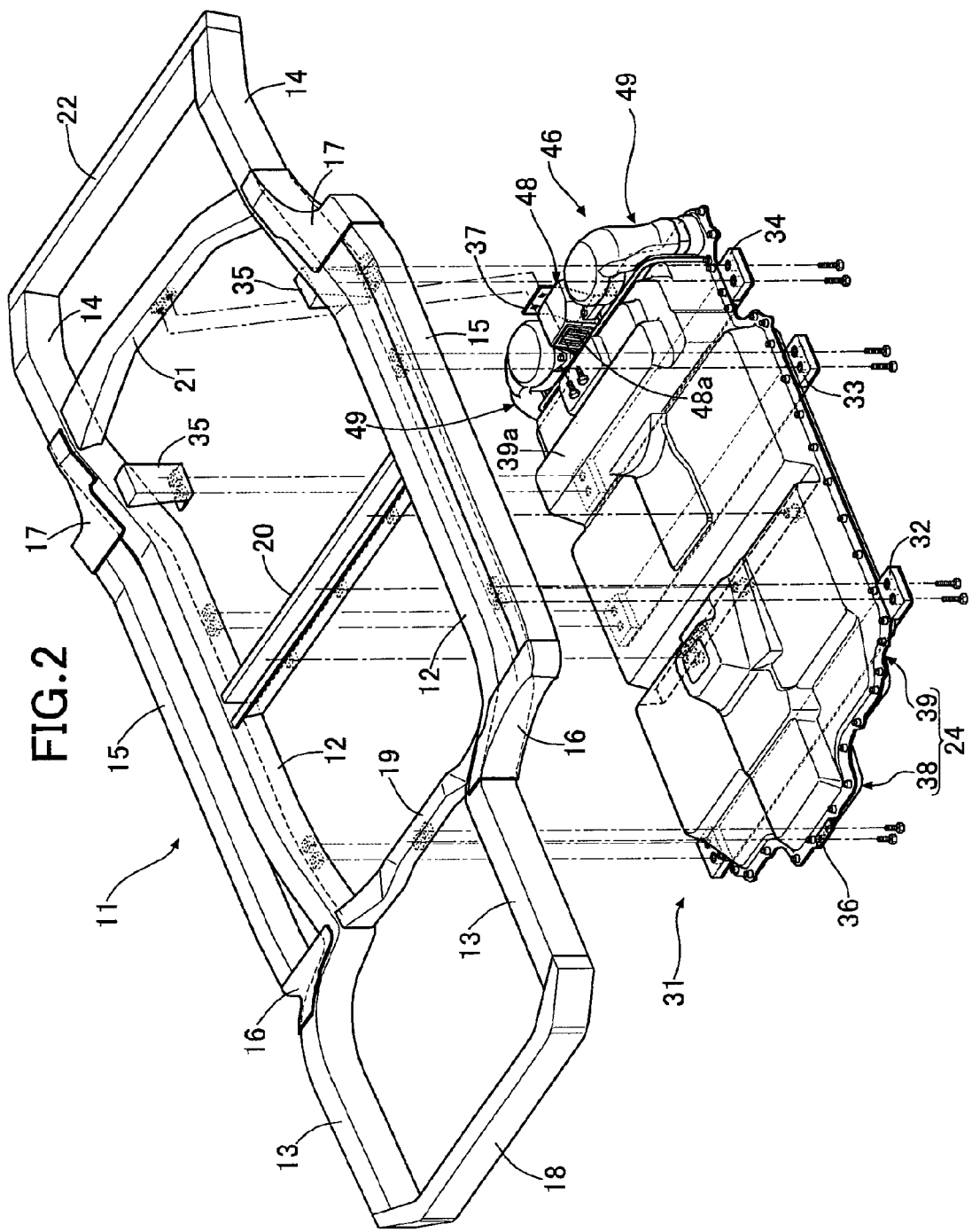
FIG. 2 is a perspective view of a vehicle body frame and a battery pack. (first embodiment)

As shown in FIG. 1 and FIG. 2, a vehicle body frame 11 of an electric automobile includes a pair of left and right floor frames 12 and 12 extending in the vehicle body fore-and-aft direction, a pair of left and right front side frames 13 and 13 extending forwardly from the front ends of the floor frames 12 and 12 while bending upwardly, a pair of left and right rear side frames 14 and 14 extending rearwardly from the rear ends of the floor frames 12 and 12 while bending upwardly, a pair of left and right side sills 15 and 15 disposed outside in the vehicle width direction of the floor frames 12 and 12, a pair of left and right front outriggers 16 and 16 connecting the front ends of the side sills 15 and 15 to the front ends of the floor frames 12 and 12, a pair of left and right rear outriggers 17 and 17 connecting the rear ends of the side sills 15 and 15 to the rear ends of the floor frames 12 and 12, a front bumper beam 18 providing a connection between front end parts of the pair of left and right front side frames 13 and 13 in the vehicle width direction, a front cross member 19 providing a connection between front end parts of the pair of left and right floor frames 12 and 12 in the vehicle width direction, a middle cross member 20 providing a connection between intermediate parts, in the fore-and-aft direction, of the pair of left and right floor frames 12 and 12 in the vehicle width direction, a rear cross member 21 providing a connection between intermediate parts, in the fore-and-aft direction, of the pair of left and right rear side frames 14 and 14 in the vehicle width direction, and a rear bumper beam 22 providing a connection between rear end parts of the pair of left and right rear side frames 14 and 14 in the vehicle width direction.

A battery pack 31, which is a power source for a motor/generator 23 that is a drive source for making the electric automobile travel, is supported so as to be suspended from a lower face of the vehicle body frame 11. That is, fixed to a lower face of the battery pack 31 are a front suspension beam 32, middle suspension beam 33, and rear suspension beam 34 extending in the vehicle width direction, fixed to front parts of the pair of left and right floor frames 12 and 12 are opposite ends of the front suspension beam 32, fixed to rear parts of the pair of left and right floor frames 12 and 12 are opposite ends of the middle suspension beam 33, and fixed to the lower ends of support members 35 and 35 hanging down from front parts of the pair of left and right rear side frames 14 and 14 are opposite ends of the rear suspension beam 34. Furthermore, a middle part, in the vehicle width direction, of the front end of the battery pack 31 is supported on the front cross member 19 via a front bracket 36, and a middle part, in the vehicle width direction, of the rear end of the battery pack 31 is supported on the rear cross member 21 via a rear bracket 37. Moreover, the battery pack 31 is supported on a lower face of the middle cross member 20 in an intermediate position between the front suspension beam 32 and the middle suspension beam 33.

In a state in which the battery pack 31 is supported on the vehicle body frame 11, an upper face of the battery pack 31 opposes a lower part of a vehicle compartment 25 via a floor panel 26. That is, the battery pack 31 of the present embodiment is disposed outside the vehicle compartment 25.

Figure 3:
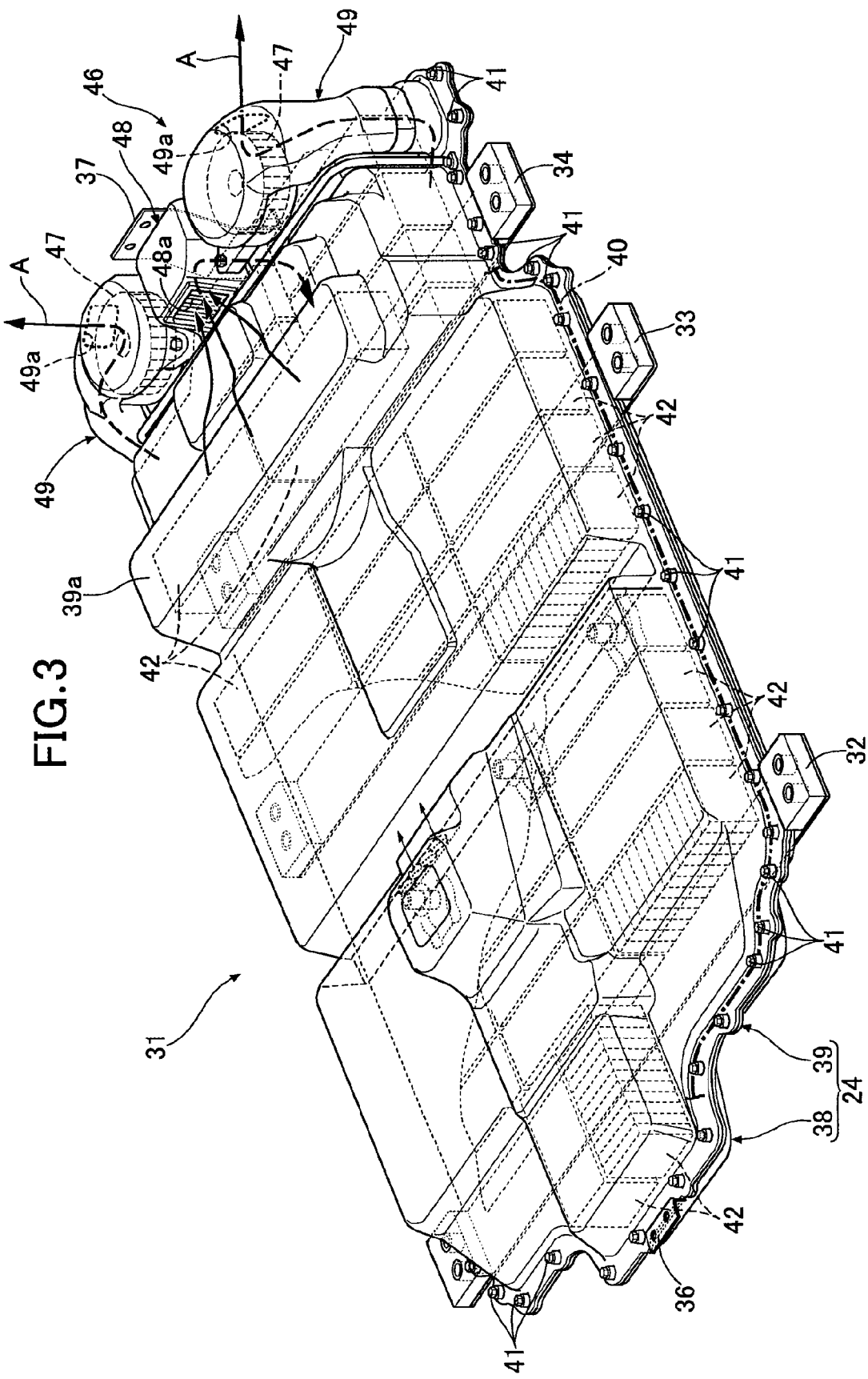
FIG. 3 is a perspective view of the battery pack. (first embodiment)
Figure 4:
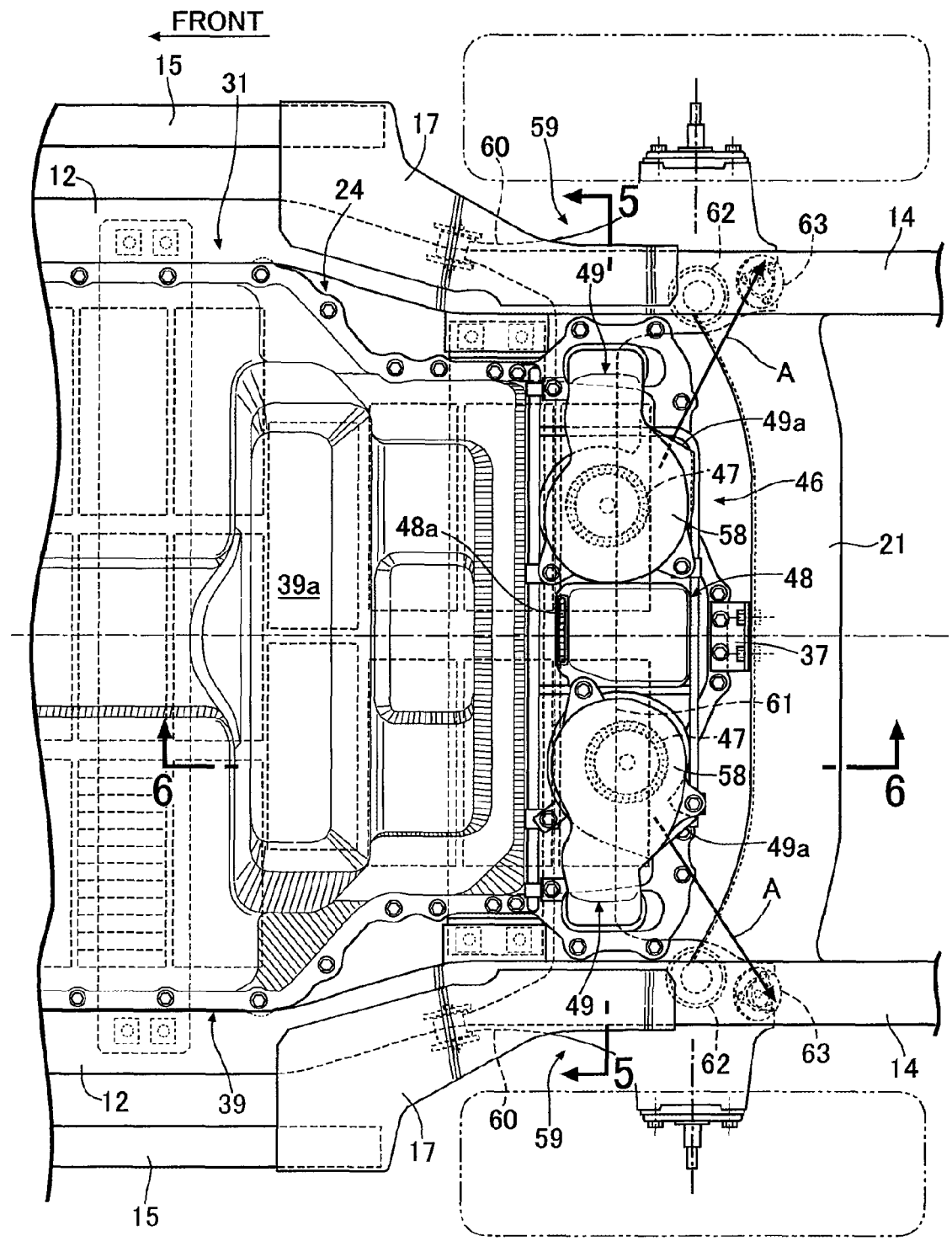
FIG. 4 is a view in the direction of arrow 4 in FIG. 1. (first embodiment)
Figure 5:
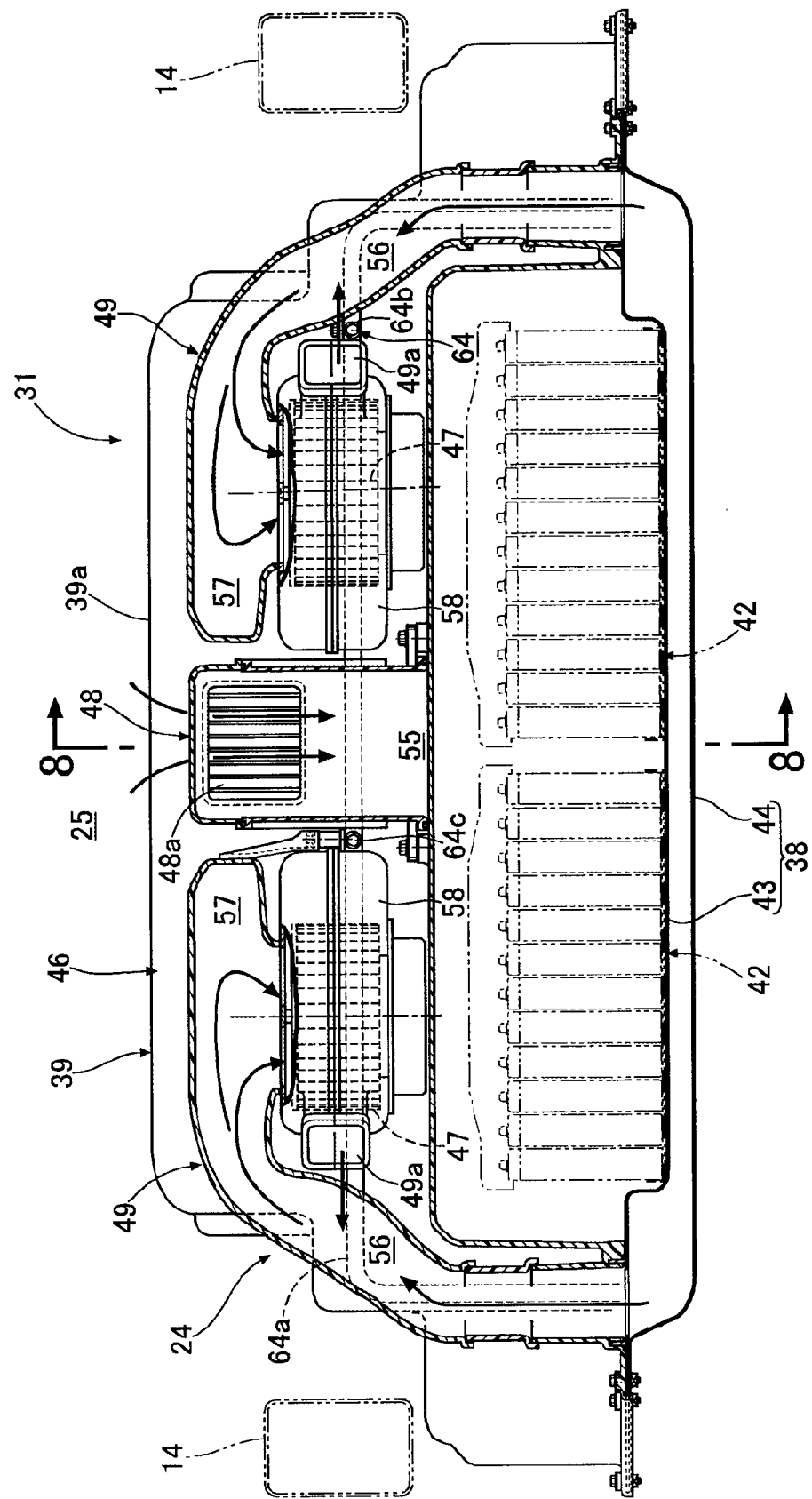
FIG. 5 is a sectional view along line 5-5 in FIG. 4. (first embodiment)
Figure 6:
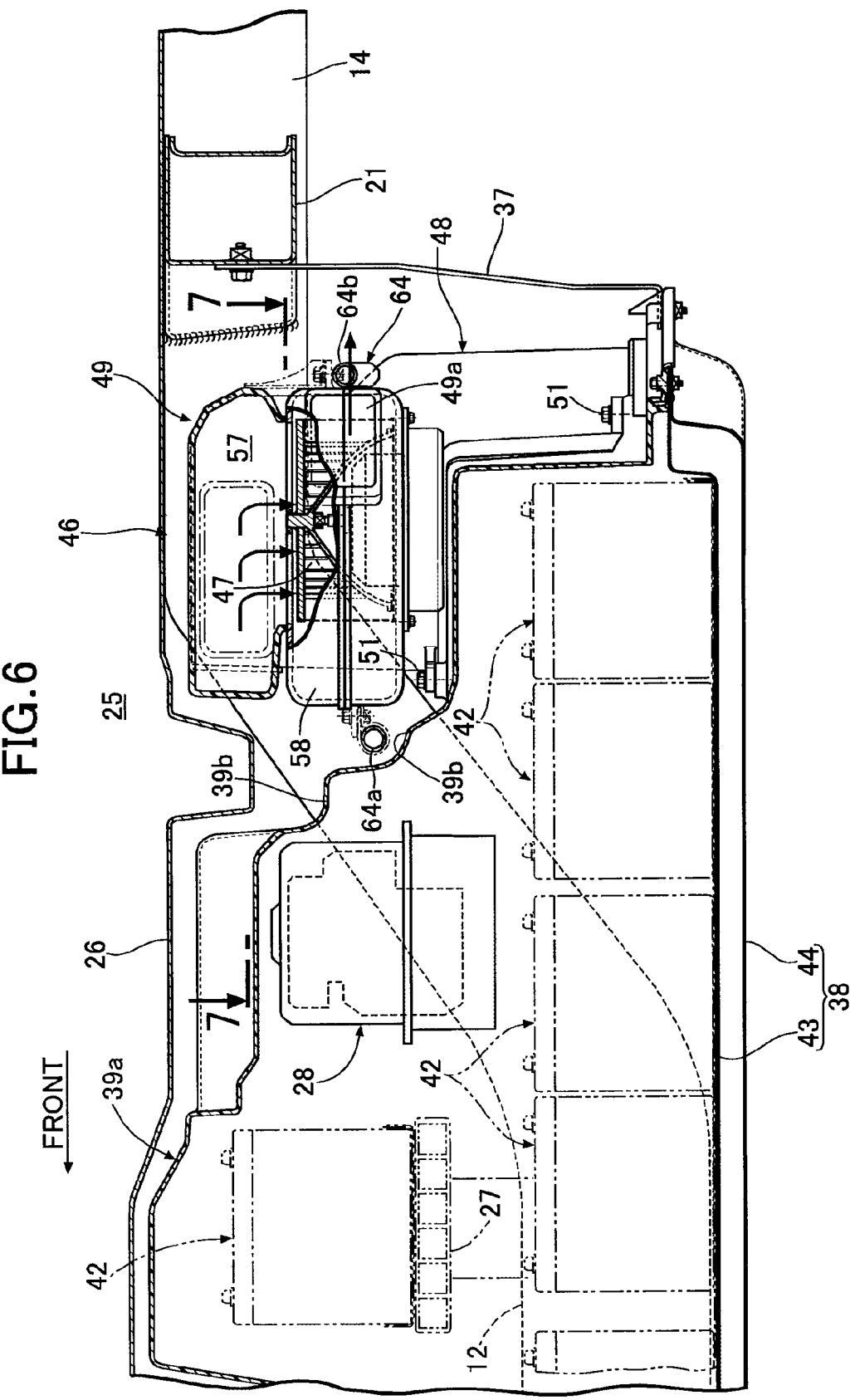
FIG. 6 is a sectional view along line 6-6 in FIG. 4. (first embodiment)

As shown in FIG. 3 and FIG. 4, the battery pack 31 includes a battery tray 38 made of metal and a battery cover 39, made of a synthetic resin, superimposed on the battery tray 38 from above. A peripheral part of the battery tray 38 and a peripheral part of the battery cover 39 are secured by means of a large number of bolts 41 with a seal member 40 (see FIG. 3) sandwiched therebetween, the interior of the battery pack 31 being therefore basically hermetically sealed. A plurality of battery modules 42, in which a plurality of battery cells are stacked in series, are mounted on an upper face of the battery tray 38. The battery tray 38 and the battery cover 39 form a battery case 24 of the present invention.

The battery tray 38 is formed by joining an upper plate 43 and a lower plate 44 (see FIG. 5 and FIG. 6), a cooling passage for cooling air to flow being formed therebetween, and heat exchange is carried out with the battery modules 42, which are in contact with an upper face of the upper plate 43, thus cooling the battery modules 42, which generate heat by charging/discharging.

A cooling device 46 provided on a rear part of the battery pack 31 includes a suction duct 48 disposed in a middle part in the vehicle width direction and a pair of left and right discharge ducts 49 and 49 disposed on opposite sides in the vehicle width direction of the suction duct 48. The lower end of the suction duct 48 and the lower ends of the left and right discharge ducts 49 and 49 are connected to the cooling passage in the interior of the battery tray 38. A cooling air suction port 48a opens on a front face of an upper part of the suction duct 48 so as to face forward, the cooling air suction port 48a sucking air outside the battery pack 31 into the interior of the suction duct 48 as cooling air. Electric cooling fans 47 and 47 are housed in the interiors of the respective discharge ducts 49 and 49, and cooling air discharge ports 49a and 49a are formed so as to face the outer peripheries of the respective cooling fans 47 and 47, the cooling air discharge ports 49a and 49a discharging cooling air that has been subjected to heat exchange. The left and right cooling air discharge ports 49a and 49a open rearwardly and outwardly in the vehicle width direction (see arrow A in FIG. 3, FIG. 4, and FIG. 7).

Therefore, when the cooling fans 47 and 47 are driven, cooling air sucked in via the cooling air suction port 48a of the suction duct 48 is supplied to the interior of the battery tray 38, carries out heat exchange with the battery modules 42 while flowing through the cooling passage in the interior of the battery tray 38, then passes through the cooling fans 47 and 47 of the discharge ducts 49 and 49, and is discharged via the cooling air discharge ports 49a and 49a.

The structure of the cooling device 46 is now explained in detail by reference to FIG. 4 to FIG. 8.

Figure 7:
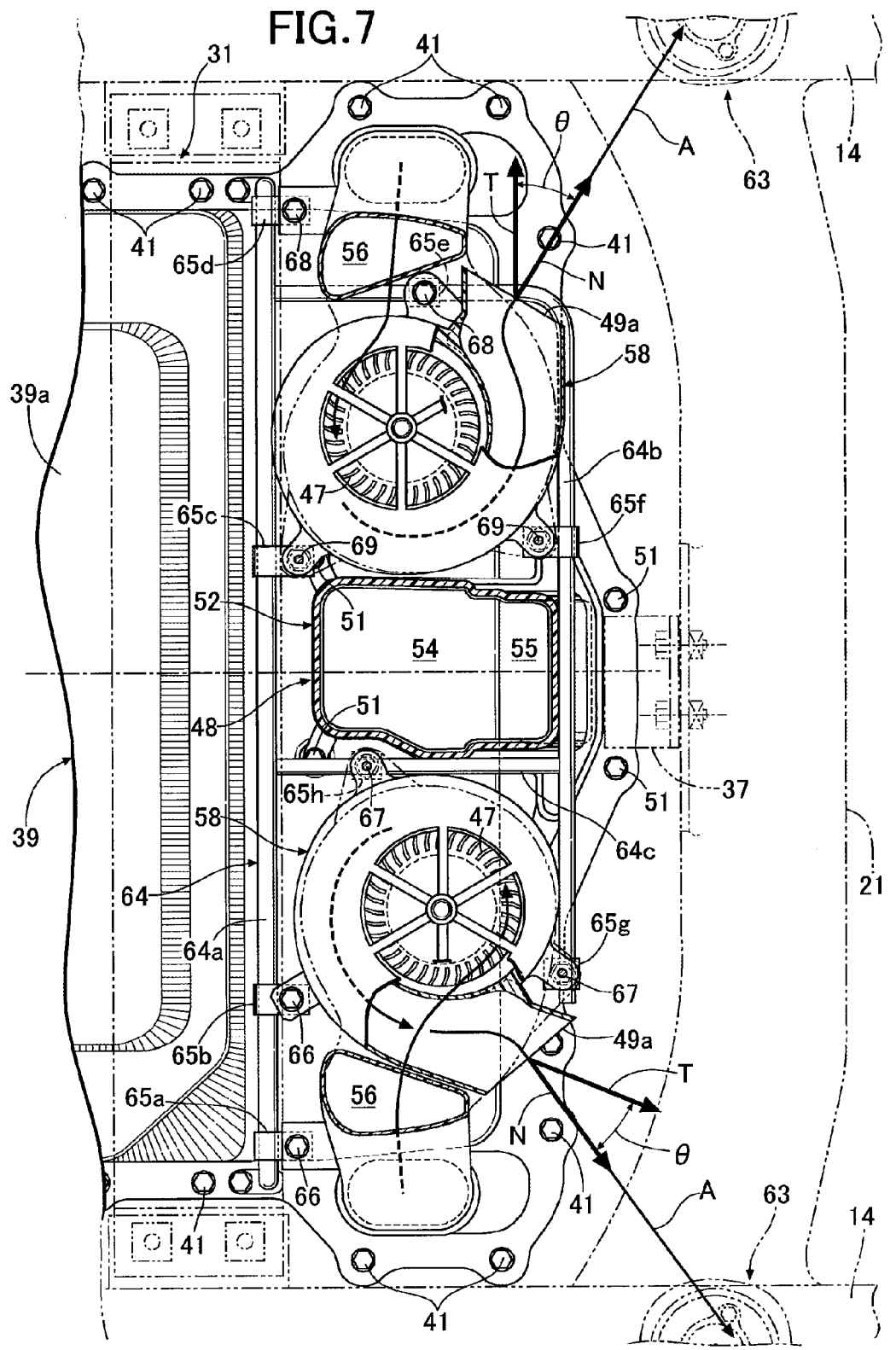
FIG. 7 is a sectional view along line 7-7 in FIG. 6. (first embodiment)
Figure 8:
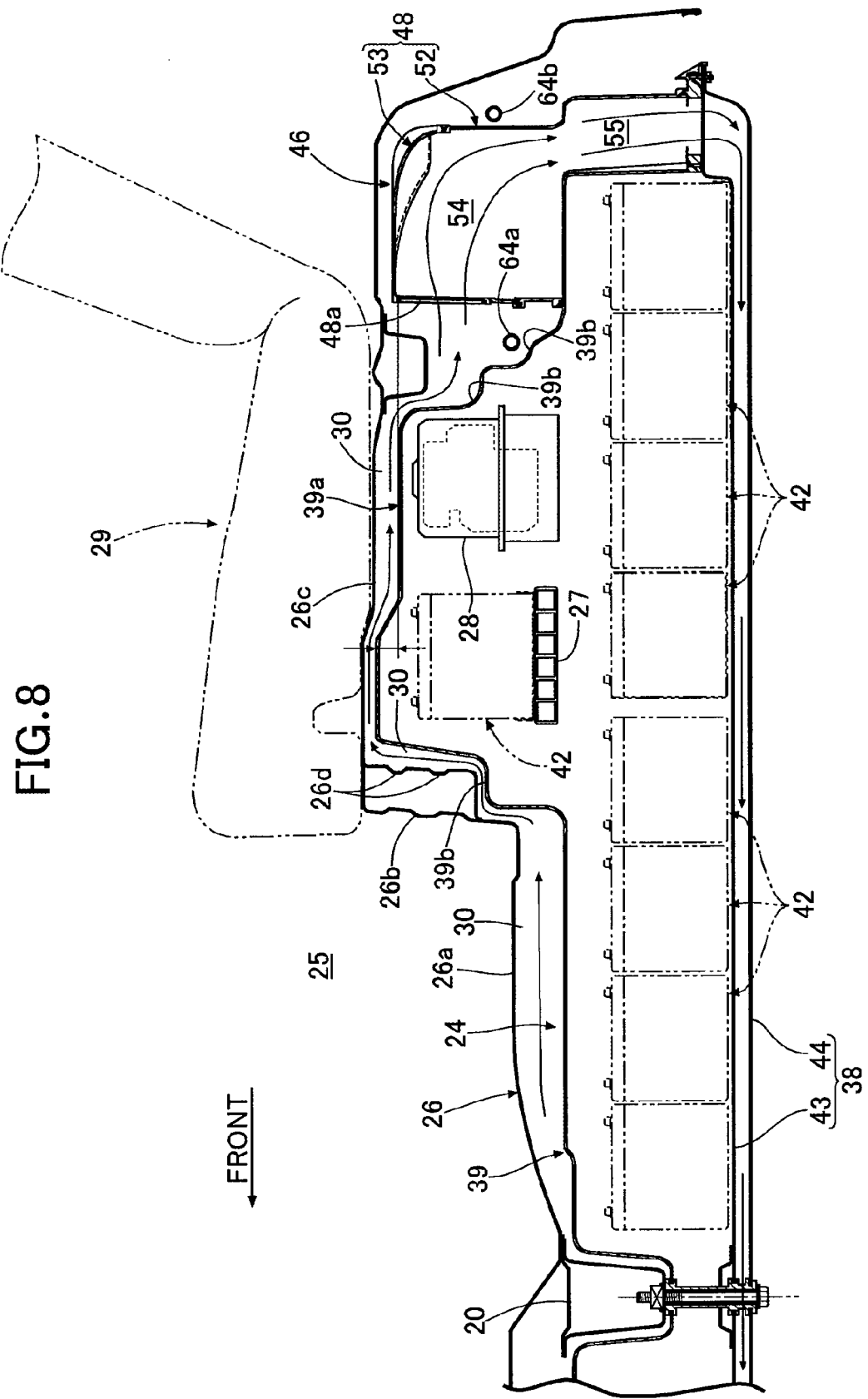
FIG. 8 is a sectional view along line 8-8 in FIG. 5. (first embodiment)

As shown in FIG. 7 and FIG. 8, the suction duct 48 of the cooling device 46 is provided to the rear of a projecting portion 39a protruding upwardly from a rear part of the battery cover 39 (see FIG. 8), and includes a lower member 52 fixed to an upper face of the battery cover 39 by means of four bolts 51 and an upper member 53 joined so as to cover an open part at the upper end of the lower member 52, the cooling air suction port 48a opening on a front face of the upper member 53. With regard to the position of the cooling air suction port 48a, it is positioned above a rear part of the battery pack 31 and is positioned to the rear of the projecting portion 39a of the battery cover 39, and the height of the upper end of the projecting portion 39a is set so as to be higher than the height of the upper end of the cooling air suction port 48a.

The interior of the suction duct 48 includes an upstream side suction passage 54 extending rearwardly from the cooling air suction port 48a, and a downstream side suction passage 55 extending downwardly from the rear end of the upstream side suction passage 54 and communicating with the cooling passage of battery tray 38. The upstream side suction passage 54 is defined in the interior of the upper member 53, and the downstream side suction passage 55 is defined in the interior of the lower member 52.

The projecting portion 39a of the battery cover 39 is formed as a hollow, and two battery modules 42 and 42 are arranged side by side in the vehicle width direction in a front portion thereof at a position that is stepped higher than the other battery modules 42. A battery support member 27 for supporting the two battery modules 42 and 42 is formed as a hollow, cooling air flowing through the interior thereof. A rear portion of the projecting portion 39a of the battery cover 39 houses a junction board 28 for supporting an electrical component such as a contactor or a fuse. A front face of the projecting portion 39a is formed into a stepped shape having one stepped portion 39b, and a rear face of the projecting portion 39a is also formed into a stepped shape having two stepped portions 39b and 39b.

The floor panel 26 disposed above the battery cover 39 includes a footrest portion 26a for an occupant seated on a rear seat 29 to place his/her feet on, a vertical wall portion 26b rising upwardly from the rear end of the footrest portion 26a, and a seat support portion 26c extending rearwardly from the upper end of the vertical wall portion 26b and supporting the rear seat 29. The footrest portion 26a of the floor panel 26 faces a portion, in front of the projecting portion 39a, of the battery cover 39 across a small gap, the vertical wall portion 26b of the floor panel 26 faces a front face of the projecting portion 39a of the battery cover 39 across a small gap, and the seat support portion 26c of the floor panel 26 faces a top face of the projecting portion 39a of the battery cover 39 across a small gap. As a result, a bent cooling air introduction passage 30 is formed between the battery cover 39 and the floor panel 26 bent into a cranked shape when viewed from the side, and the cooling air suction port 48a of the suction duct 48 opens to the rear of the cooling air introduction passage 30. Furthermore, formed on the vertical wall portion 26b of the floor panel 26 opposing the front face of the projecting portion 39a of the battery cover 39 are irregularly shaped portions 26d formed from a plurality of grooves extending in parallel to the vehicle width direction.

As shown in FIG. 4 to FIG. 7, the discharge ducts 49 and 49 of the cooling device 46 include upstream side discharge passages 56 and 56 rising upwardly from the downstream end of the cooling passage of the battery tray 38, and downstream side discharge passages 57 and 57 extending to the inside in the vehicle width direction from the upper ends of the upstream side discharge passages 56 and 56, and the cooling fans 47 and 47 are disposed immediately below the downstream side discharge passages 57 and 57. Spiral-shaped fan casings 58 and 58 surround the outer peripheries of the cooling fans 47 and 47, and the cooling air discharge ports 49a and 49a open at the outer ends of the fan casings 58 and 58.

The fan casings 58 and 58 for the left and right cooling fans 47 and 47 employ interchangeable identical members, and therefore when viewed from above (see FIG. 7) the left and right fan casings 58 and 58 are asymmetrical with respect to the vehicle body center line. As described above, the cooling air discharge ports 49a and 49a of the left and right cooling fans 47 and 47 discharge cooling air, as shown by arrow A, rearwardly and outwardly in the vehicle width direction, a normal N perpendicular to the cooling air discharge ports 49a and 49a being inclined relative to a tangent T of the fan casings 58 and 58 only by an angle θ.

Since cooling air flows out at right angles to a plane formed by the cooling air discharge ports 49a and 49a, due to the normal N perpendicular to the cooling air discharge ports 49a and 49a being inclined relative to the tangent T of the fan casings 58 and 58 only by the angle θ it is possible to discharge cooling air from the left and right cooling air discharge ports 49a and 49a in substantially symmetrical directions while reducing the number of types of components by using the interchangeable identical members for the left and right fan casings 58 and 58.

Suspension systems 59 and 59 for the suspension of rear wheels (see FIG. 4) are formed from for example an H-shaped torsion beam type suspension, and include left and right trailing arm parts 60 and 60, a torsion beam part 61 for connecting them in the vehicle width direction, and left and right suspension springs 62 and 62 and left and right suspension dampers 63 and 63 for supporting the rear ends of the trailing arm parts 60 and 60 on lower faces of the rear side frames 14 and 14.

The directions (see arrows A) in which cooling air is discharged from the cooling air discharge ports 49a and 49a of the left and right fan casings 58 and 58 overlap parts of the suspension systems 59 and 59 (the suspension dampers 63 and 63 in the embodiment) when viewed from above. Since the direction A in which cooling air is discharged from the cooling air discharge ports 49a and 49a is set so as to be the direction described above, cooling air can be discharged smoothly outside the vehicle through spaces in the suspension systems 59 and 59 while minimizing interference with the vehicle body.

A support frame 64 supporting the discharge ducts 49 and 49 together with the cooling fans 47 and 47 on the upper face of the rear part of the battery case 24 includes a first frame 64a formed by bending a pipe material into an inverted U-shape and providing opposite ends thereof so as to stand on left and right upper faces of the battery cover 39, an L-shaped second frame 64b connected to the right end side of the first frame 64a and extending rearwardly and leftwardly, and an I-shaped third frame 64c providing a connection between the left end side of the second frame 64b and an intermediate part of the first frame 64a in the fore-and-aft direction.

The support frame 64 includes four mounting brackets 65a to 65d fixed to the first frame 64a, three mounting brackets 65e to 65g fixed to the second frame 64b, and one mounting bracket 65h fixed to the third frame 64c (see FIG. 7). The left discharge duct 49 is secured to the two mounting brackets 65a and 65b of the first frame 64a by means of bolts 66 and 66 respectively, and the left discharge duct 49 and the left cooling fan 47 are secured together to the mounting bracket 65g of the second frame 64b and the mounting bracket 65h of the third frame 64c by bolts 67 and 67 respectively.

Furthermore, the right discharge duct 49 is secured to the mounting bracket 65d of the first frame 64a and the mounting bracket 65e of the second frame 64b by means of bolts 68 and 68 respectively, and the right discharge duct 49 and the right cooling fan 47 are secured together to the mounting bracket 65c of the first frame 64a and the mounting bracket 65f of the second frame 64b by means of bolts 69 and 69 respectively.

In this way, since the discharge ducts 49 and 49 and the cooling fans 47 and 47 are secured together to the support frames by the common bolts 67, 67, 69, and 69, it is possible to reduce the size of the cooling device 46 and cut the number of components.

The operation of the embodiment of the present invention having the above arrangement is now explained.

Since the battery modules 42 housed within the battery case 24 of the battery pack 31 generate heat due to charging/discharging, they are cooled with cooling air supplied to the interior of the battery tray 38 by means of the cooling device 46. That is, when the cooling fans 47 and 47 are driven, air between the upper face of the battery case 24 and the lower face of the floor panel 26 is sucked in as cooling air via the cooling air suction port 48a of the suction duct 48 and supplied to the interior of the battery tray 38 via the upstream side suction passage 54 and downstream side suction passage 55 of the suction duct 48.

As shown in FIG. 3, cooling air supplied to the interior of the battery tray 38 carries out heat exchange between the upper plate 43 of the battery tray 38 and the bottom faces of the battery modules 42 while flowing through the cooling passage in the interior of the battery tray 38, thus cooling the battery modules 42. Cooling air that has flowed from the cooling passage into the discharge ducts 49 and 49 passes through the upstream side discharge passages 56 and 56, the downstream side discharge passages 57 and 57, and the cooling fans 47 and 47, and is discharged via the cooling air discharge ports 49a and 49a of the fan casings 58 and 58.

Furthermore, since the battery pack 31 is mounted beneath the vehicle compartment 25 and the suction duct 48 and the discharge ducts 49 and 49 are disposed at positions sandwiched between the battery case 24 and the vehicle compartment 25, the cooling air suction port 48a of the suction duct 48 and the cooling air discharge ports 49a and 49a of the discharge ducts 49 and 49 are formed at relatively high positions of the battery pack 31, and the cooling air suction port 48a and the cooling air discharge ports 49a and 49a are covered from above and from below by the floor panel 26 and the battery case 24, thereby making it difficult for dust or water dropping from above or dust or water thrown up from a road surface or a wheel to enter via the cooling air suction port 48a or the cooling air discharge ports 49a and 49a.

Moreover, since the suction duct 48 and the discharge ducts 49 and 49 are disposed so that parts thereof overlap when viewed in the vehicle width direction, it becomes possible to compactly place together the suction duct 48 and the discharge ducts 49 and 49, to make the suction duct 48 and the discharge ducts 49 and 49 less likely to interfere with the floor panel 26, which has a step part extending in the vehicle width direction, the rear cross member 21 extending in the vehicle width direction, etc., and to make layout of the battery pack 31 in the vehicle body easy. Furthermore, since the discharge ducts 49 and 49 are disposed on opposite sides, in the vehicle width direction, of the suction duct 48, which is disposed in the middle in the vehicle width direction, positioning the discharge ducts 49 and 49 between the suction duct 48 and the wheels, which throw up dust or water, enables it to be made difficult for dust or water to be sucked in together with cooling air via the cooling air suction port 48a.

Furthermore, since the suction duct 48 is disposed in the upper part at the rear end of the battery cover 39, the projecting portion 39a is provided on the battery cover 39 so as to protrude upwardly toward the vehicle compartment 25, and the suction duct 48 is disposed to the rear of the projecting portion 39a of the battery cover 39, the projecting portion 39a of the battery cover 39 can provide shielding from dust or water, which is thrown up from the front of the vehicle body while the vehicle is traveling, thus making it difficult for dust or water to be sucked into the interior of the battery cover 39 via the cooling air suction port 48*a*. In this arrangement, since the height of the upper end of the projecting portion 39*a* is at a position higher than the height of the upper end of the cooling air suction port 48*a*, it is possible to enhance the effect in trapping dust or water by reliably shielding the cooling air by means of the projecting portion 39*a*.

Furthermore, since the plurality of stepped portions 39*b*, whose height changes in a stepped manner from the upstream side in the direction of flow of cooling air toward the cooling air suction port 48*a*, are formed on the front face and the rear face of the projecting portion 39*a* of the battery case 39, the surface area of the projecting portion 39*a* that is in contact with cooling air is increased by the stepped portions 39*b*, thus removing dirt or water contained in the cooling air more effectively. Moreover, since the interior of the projecting portion 39*a* of the battery case 39 houses the battery modules 42 or the junction board 28, which are heat generating members, it is possible to quickly evaporate water that has been removed from the cooling air and has adhered to the projecting portion 39*a* by means of heat generated by the battery modules 42 or the junction board 28, thus more reliably preventing the battery modules 42 from becoming wet with water.

Furthermore, since the cooling air introduction passage 30 for introducing cooling air to the cooling air suction port 48*a* is formed between the floor panel 26 and the battery case 24, cooling air is put into contact with both the floor panel 26 and the battery case 24 until reaching the cooling air suction port 48*a*, thus removing dirt or water contained in the cooling air more effectively. In particular, since the floor panel 26 is provided with the footrest portion 26*a* for an occupant to place his/her feet on, the vertical wall portion 26*b* rising upwardly from the footrest portion 26*a*, and the seat support portion 26*c* extending rearwardly from the vertical wall portion 26*b* and supporting the rear seat 29, the crank-shaped cooling air introduction passage 30 is formed between the floor panel 26 and the projecting portion 39*a* of the battery case 24, thus removing dirt or water from cooling air flowing therethrough more effectively. Moreover, since the irregularly shaped portions 26*d* are formed on the floor panel 26 opposing the projecting portion 39*a* of the battery case 24, cooling air flowing through the cooling air introduction passage 30 is put into contact with the irregularly shaped portions 26*d* of the floor panel 26, thus removing dirt or water more effectively.

Moreover, since the cooling air suction port 48*a* of the suction duct 48 opens so as to face toward the front of the vehicle body, and the cooling air discharge ports 49*a* and 49*a* of the discharge ducts 49 and 49 open so as to face toward the rear of the vehicle body, it is possible to make it difficult for cooling air that has been discharged via the cooling air discharge ports 49*a* and 49*a* and has an increased temperature after heat exchange to be sucked again into the battery tray 38 via the cooling air suction port 48*a*, thus preventing degradation of the cooling efficiency of the battery modules 42 due to recirculation of cooling air. In particular, since the cooling air discharge ports 49*a* and 49*a* open so as to face toward the rear of the vehicle body and to the outside in the in the vehicle width direction, cooling air that has been discharged via the cooling air discharge ports 49*a* and 49*a* is pushed rearwardly by means of traveling air flowing along left and right side faces of the vehicle body, thus making it difficult for it to stay in the vicinity of the battery pack 31.

An embodiment of the present invention is explained above, but the present invention may be modified in a variety of ways as long as the modifications do not depart from the spirit and scope thereof.

For example, in the embodiment, the cooling air suction port 48*a* is provided integrally with the battery case 24, but a cooling air suction port 48*a* may be provided separately from a battery case 24 and the two may be connected via a duct, etc.

Furthermore, the heat generating member of the present invention is not limited to the battery module 42 or the junction board 28 of the embodiment.

The invention claimed is:

1. A battery pack for an electric vehicle, the battery pack comprising a battery case that houses a plurality of batteries, a cooling air suction port that sucks cooling air into a cooling passage formed in an interior of the battery case, and a cooling air discharge port that discharges cooling air from the cooling passage, wherein
the cooling air suction port is provided in the vicinity of an end part on the downstream side, in a direction of flow of cooling air, on an exterior of the battery case so as to oppose the direction of flow, the battery case comprises a projecting portion that rises on the upstream side in the direction of flow of the cooling air suction port so as to disturb the flow of cooling air, and an upper end of the projecting portion (39*a*) is at a position higher than an upper end of the cooling air suction port.

2. The battery pack for an electric vehicle according to claim 1, wherein the projecting portion is formed so that a height thereof changes in a stepped manner in going from the upstream side in the direction of flow toward the cooling air suction port.

3. The battery pack for an electric vehicle according to claim 2, wherein the projecting portion is formed so as to be hollow, and a heat generating member is housed in an interior thereof.

4. The battery pack for an electric vehicle according to claim 1, wherein the projecting portion is formed so as to be hollow, and a heat generating member is housed in an interior thereof.

5. A battery pack mounting structure according to claim 1, wherein
the battery case is mounted beneath a floor panel of the vehicle, and a cooling air introduction passage for introducing cooling air into the cooling air suction port is formed between the floor panel and the battery case.

6. The battery pack mounting structure according to claim 5, wherein the floor panel comprises a footrest portion that is for an occupant to place his/her feet on, a vertical wall portion that rises upwardly from the footrest portion, and a seat support portion that extends rearwardly from the vertical wall portion and supports a rear seat, and the cooling air introduction passage is formed into a cranked shape between the projecting portion and the footrest portion, vertical wall portion and seat support portion.

7. The battery pack mounting structure according to claim 5, wherein an irregularly shaped portion is formed on the floor panel opposing the projecting portion.

* * * * *